E. MORGAN.
Grain-Drill.
No. 14,465.
Patented Mar. 18. 1856.
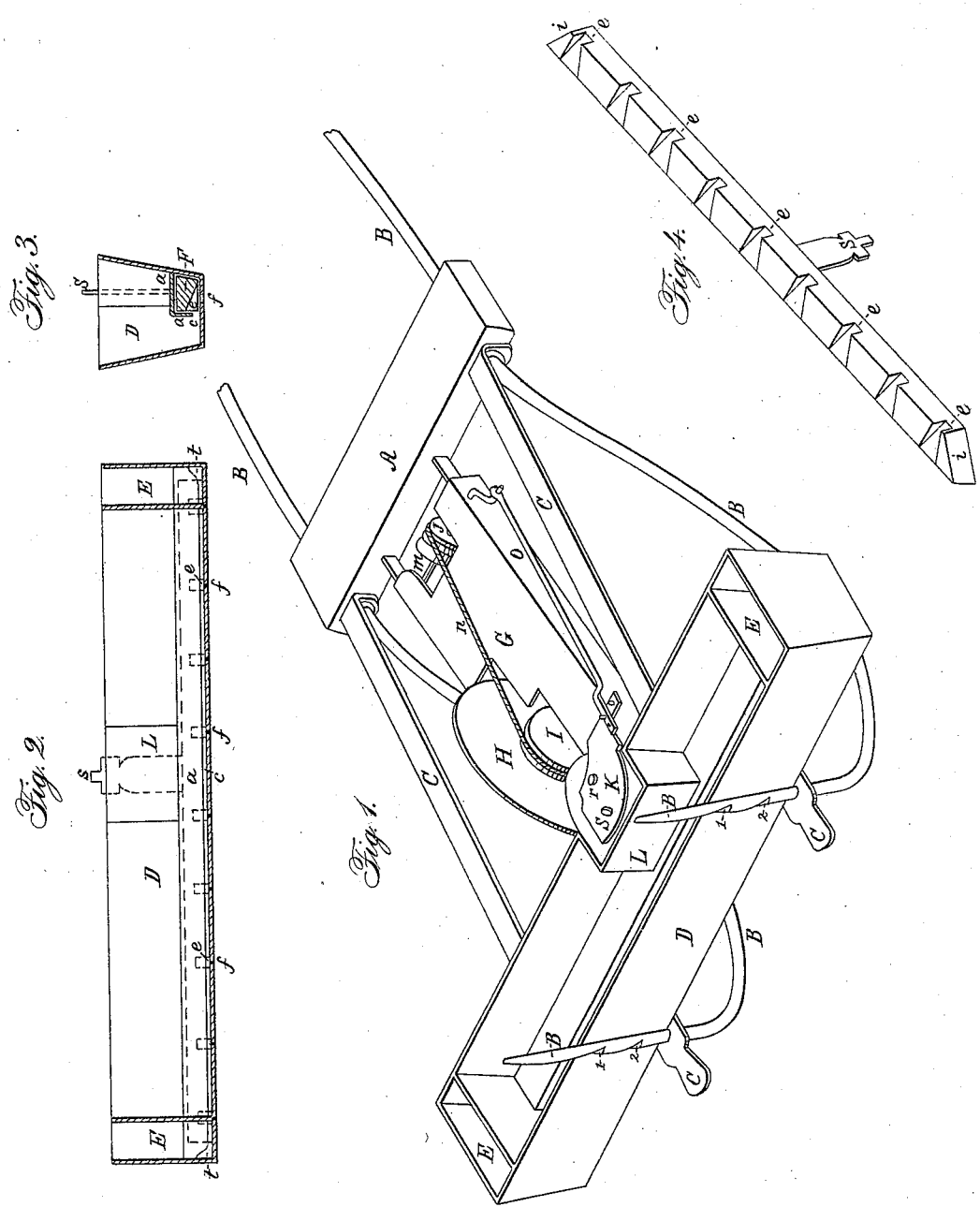

UNITED STATES PATENT OFFICE.

ELIJAH MORGAN, OF MORGANTOWN, VIRGINIA.

IMPROVEMENT IN SEED-PLANTERS.

Specification forming part of Letters Patent No. 14,465, dated March 18, 1856.

*To all whom it may concern:*

Be it known that I, ELIJAH MORGAN, of Morgantown, in the county of Monongalia and State of Virginia, have invented certain new and useful Improvements in Seed-Planters; and I do hereby declare the following to be a full, clear, and exact description of the same, reference being had to the accompanying drawings, making a part thereof, in which—

Figure 1 represents a perspective view of the entire machine. Fig. 2 represents a longitudinal vertical section through the hopper. Fig. 3 represents a vertical transverse section through the hopper, and Fig. 4 represents a perspective view from the under side of the seeding-bar.

Similar letters, where they occur in the several figures, denote like parts in all.

A represents a cross-bar, through which the rods B B, that form both the thills and runners of the seed-planter, pass. Those portions of the rods B in rear of the cross-bar A are first bent downward to form the runners, and then turned up vertically, or nearly so, as seen in Fig. 1, and furnished with notches or ratchteeth 1 2, &c. From the rear of this same bar A start two supporting-pieces, C C, having holes in their rear ends, which slip over the vertical rear portions of the rods B, and by means of suitably-formed surfaces in said holes the braces or supporting-pieces may be made to catch and rest upon either of the sets of ratch teeth 1 2, &c.

Upon the supporting-pieces C rests the hopper D, and said hopper may be raised or lowered by raising or lowering the pieces C in the notches 1 2, &c., as circumstances may require. In windy weather the hopper may be lowered to prevent the grain from being too much scattered, while in calm weather it may be raised up higher. The hopper hangs, as it were, on springs, and the motion of the machine over the ground is just sufficient to agitate the grain and make it drop regularly, at least as regularly as broadcast sowing requires.

At each end of the interior of the hopper D is a false hopper, E E, for receiving the excess of grain that may be carried past the openings in the bottom of the hopper, and which relieves the seeding-bar from vibrating endwise against the grain, as will be explained in connection with the seeding-bar.

A shield, a, (see Fig. 3,) is fastened to the front inside part of the hopper, and extends back first horizontally, then downward, leaving a space between its edge and the bottom of the hopper, as at c. Under this shield the seeding-bar F vibrates, the grain passing through c, thence into the recesses e on the under side of the seeding-bar F, thence through the openings f into the ground.

However perfectly these seeding-machines are made, the cells or recesses in the seeding-bar will invariably carry some of the seed past the openings and toward the ends of the hopper. It is not only desirable to save this excess of grain, but to dispose of it so that the bar shall not wade through it or drive up against it, both of which clog the action of the machine. To avoid this evil I bevel off the ends of the seeding-bar, as at i i, Fig. 4, so that as said beveled ends are brought against the grain they will force the grain out of the line of movement of said bar and deposit it in the false hoppers E E, from whence it may be removed and placed back into the main hopper D. This arrangement, in connection with the shield, allows the seeding-bar to move freely and unencumbered by the grain, said shield being scalloped out at t, Fig. 2, to allow the grain to pass out.

To the rear of the bar A, between the supporting-pieces C C, is hinged by a rod or shaft, m, a frame, G, in which is hung a wheel, H, that rests upon the ground, and rising and falling with all the undulations of the ground still receives a rotary motion from the motion of the machine.

On the shaft of the wheel H is a pulley, I, over which and over a pulley, J, on the shaft m passes an endless belt, n, which gives motion to the shaft m.

On the end of m there is a crank, to which a pitman, o, is connected by one of its ends, the other end of said pitman being connected to a segment, K, (on which it is adjustable,) said segment being pivoted at r, so as to vibrate horizontally on said pivoted point. Through the segment K projects the top of an arm, s, which is connected to the seed-bar F, and said seed-bar receives its vibratory motion through the motion of the segment.

L is a casing through which the arm s works, its object being to prevent the grain from bearing against any of the moving parts of the machine.

At t, Fig. 2, the shield is cut away or scalloped, so as to admit of a free passage of the grain from the ends of the seed-bar into the dead-hoppers.

Having thus fully described the nature of my invention, what I claim as new therein, and desire to secure by Letters Patent, is—

In combination with the dead-hoppers E E, the chamfering or beveling of the ends of the seeding-bar and the scalloping of the shield so that any grain that may be carried to the ends of the seeding-bar may be forced by it into said dead-hoppers, substantially as described.

ELIJAH MORGAN.

Witnesses:
E. M. MORGAN,
JAMES T. CRAIG.